(12) United States Patent
Oshima

(10) Patent No.: US 12,518,152 B2
(45) Date of Patent: Jan. 6, 2026

(54) RESERVOIR COMPUTER

(71) Applicant: Hitachi, Ltd., Tokyo (JP)

(72) Inventor: Takashi Oshima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1121 days.

(21) Appl. No.: 17/499,930

(22) Filed: Oct. 13, 2021

(65) Prior Publication Data

US 2022/0188617 A1 Jun. 16, 2022

(30) Foreign Application Priority Data

Dec. 15, 2020 (JP) .................................. 2020-207523

(51) Int. Cl.
*G06N 3/065* (2023.01)
(52) U.S. Cl.
CPC .................................... *G06N 3/065* (2023.01)
(58) Field of Classification Search
CPC ....................................................... G06N 3/065
See application file for complete search history.

(56) References Cited

U.S. PATENT DOCUMENTS

| | | | | |
|---|---|---|---|---|
| 11,507,818 B2* | 11/2022 | Hosseinzadeh | ........ | G06N 3/045 |
| 2009/0051421 A1* | 2/2009 | Mathe | ................... | H03H 19/004 |
| | | | | 327/554 |
| 2014/0214738 A1* | 7/2014 | Pickett | ................... | G06N 3/065 |
| | | | | 706/27 |
| 2018/0089558 A1 | 3/2018 | Wittenberg et al. | | |
| 2019/0392298 A1* | 12/2019 | Oshima | ................... | G06N 3/048 |
| 2021/0081779 A1* | 3/2021 | Kanazawa | ............. | G06N 10/40 |

FOREIGN PATENT DOCUMENTS

JP 2018-67913 A 4/2018

OTHER PUBLICATIONS

Horio (Chaotic Neural Network Reservoir, Jul. 2019, pp. 1-5) (Year: 2019).*
Aihara et al. (Neuron-Synapse IC Chip-Set for Large-Scale Chaotic Neural Networks, Sep. 2003, pp. 1393-1404) (Year: 2003).*

(Continued)

*Primary Examiner* — George Giroux
(74) *Attorney, Agent, or Firm* — MATTINGLY & MALUR, PC

(57) ABSTRACT

A reservoir computer includes a reservoir unit including a plurality of neuron circuits and an output layer. Each of the neuron circuits includes a plurality of inputs, an analog output, and a digital output. Each of the plurality of inputs is supplied with the analog output of any one of other neuron circuits, the analog output of the neuron circuit itself, or an analog input signal from the outside. The neuron circuit includes a capacitor circuit, an amplifier, a capacitor memory circuit, a buffer circuit, and an analog-to-digital conversion circuit. The capacitor circuit includes a plurality of capacitors between the plurality of inputs and a single output, performs a product-sum calculation on analog signals supplied to the plurality of inputs together with the amplifier, and performs a non-linear calculation on a result of the product-sum calculation by using saturation characteristics of the amplifier.

12 Claims, 9 Drawing Sheets

(56) References Cited

OTHER PUBLICATIONS

Rodriguez-Vazquez et al. (Nonlinear Switched-Capacitor "Neural" Networks for Optimization Problems, Mar. 1990, pp. 384-398) (Year: 1990).*
Furuta et al. (A 10-bit, 40-MS/s, 1.21 mW Pipelined SAR ADC Using Single-Ended 1.5-bit/cycle Conversion Technique, Jun. 2011, pp. 1360-1370) (Year: 2011).*
Tanaka et al. (Recent Advances in Physical Reservoir Computing: A Review, Apr. 2019, pp. 1-64) (Year: 2019).*
Bai et al. (Deep-DFR: A Memristive Deep Delayed Feedback Reservoir Computing System with Hybrid Neural Network Topology, Jun. 2019, pp. 1-6) (Year: 2019).*
Yang et al. (Programmable Switched-Capacitor Neural Network for MVDR Beamforming, Jan. 1996, pp. 77-84) (Year: 1996).*
Indiveri et al. (Neuromorphic silicon neuron circuits, May 2011, pp. 1-23) (Year: 2011).*
Kawaguchi et al. (Analog Neural Circuit with Switched Capacitor and Design of Deep Learning Model, Jul. 2015, pp. 322-327) (Year: 2015).*

* cited by examiner

[FIG. 1]
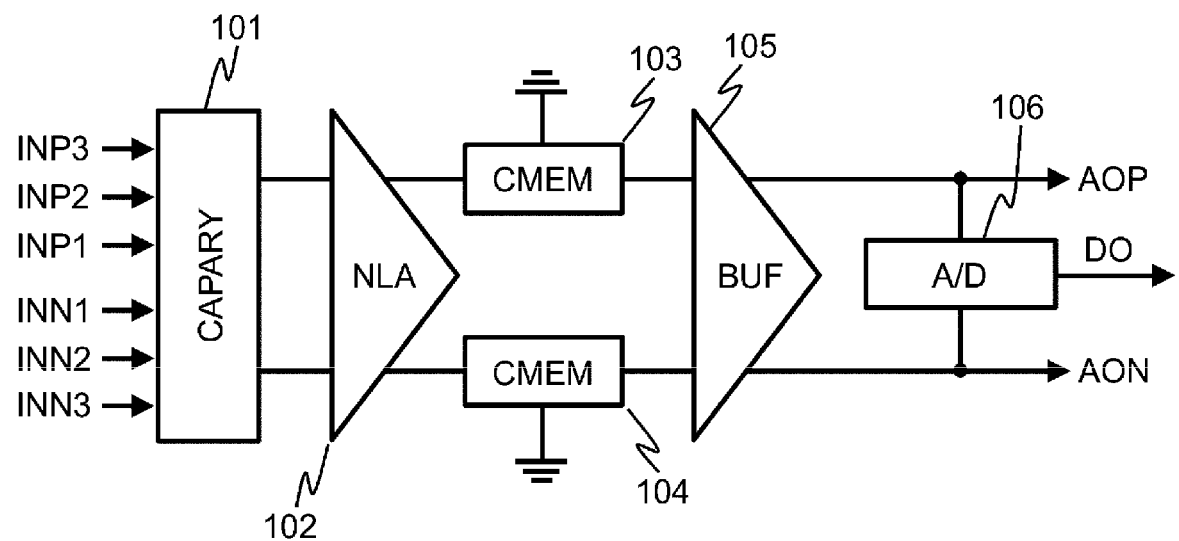

[FIG. 2]
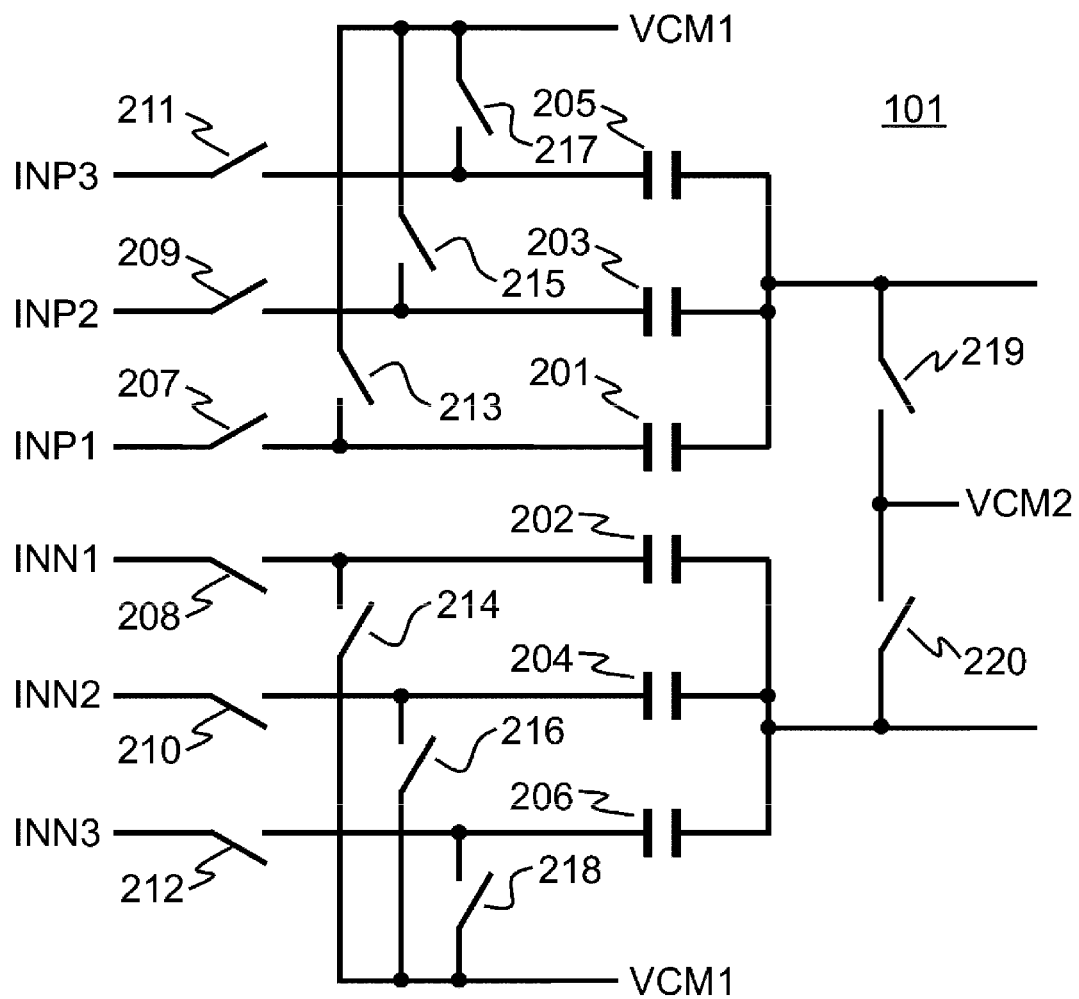

[FIG. 3]
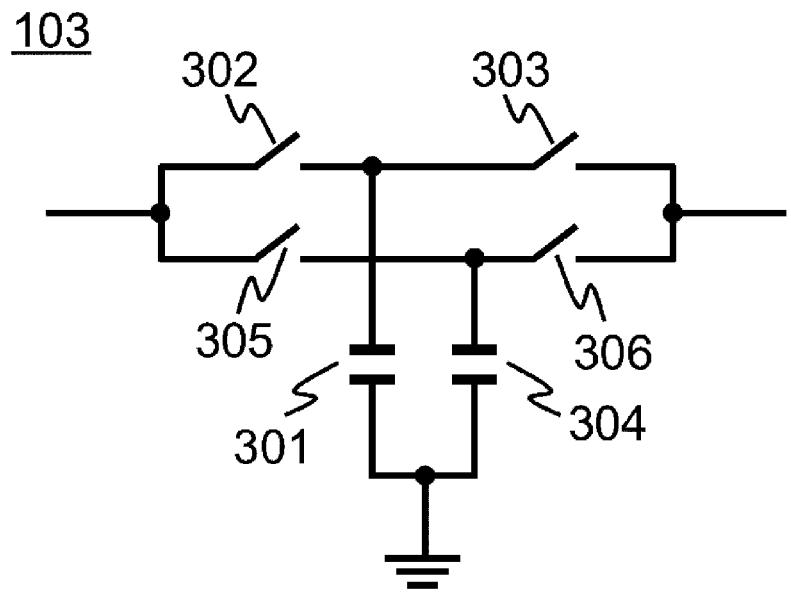
[FIG. 4]
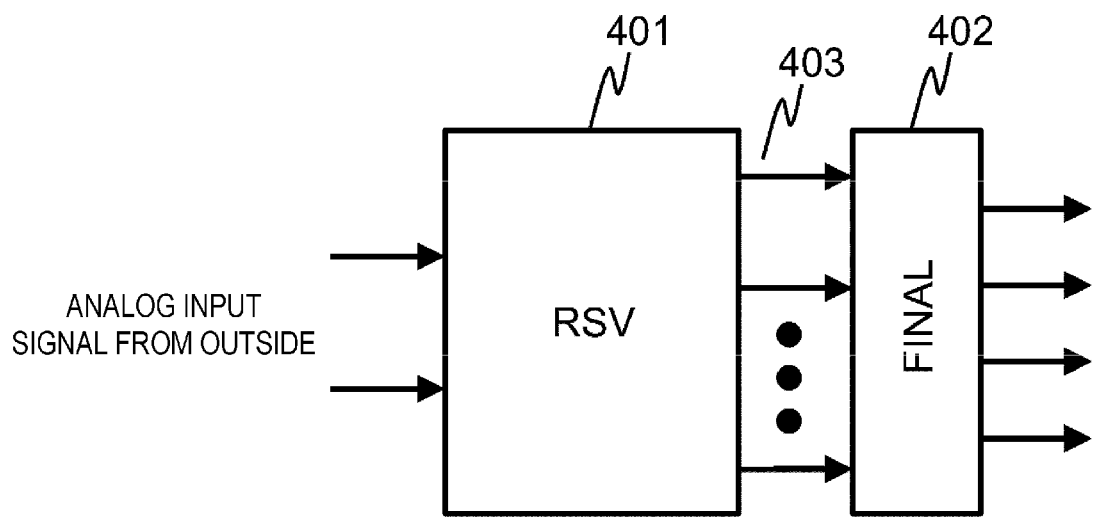

[FIG. 5]
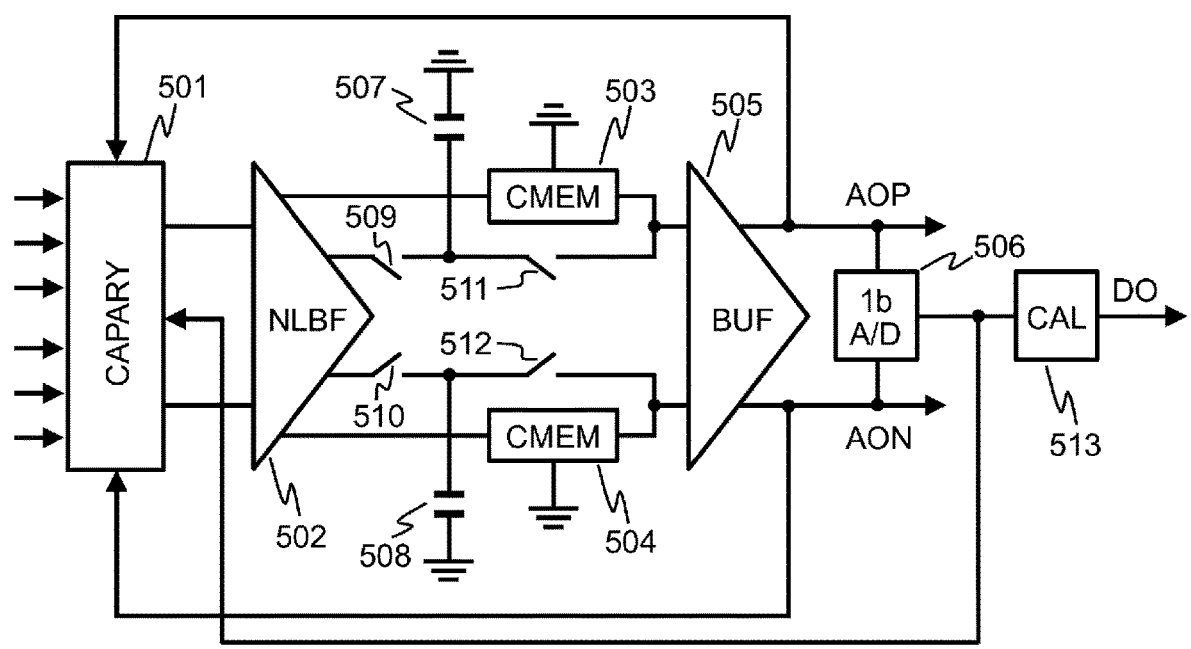

[FIG. 6]
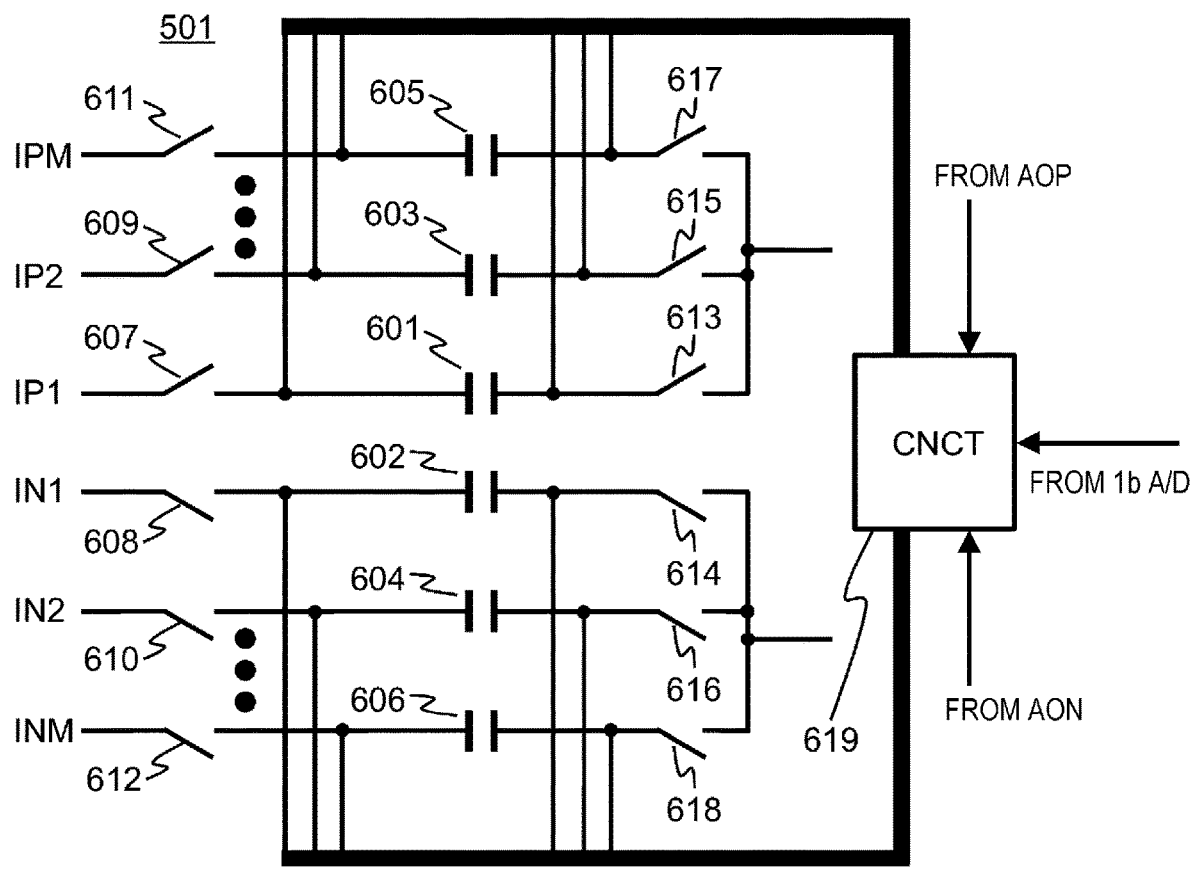

[FIG. 7]
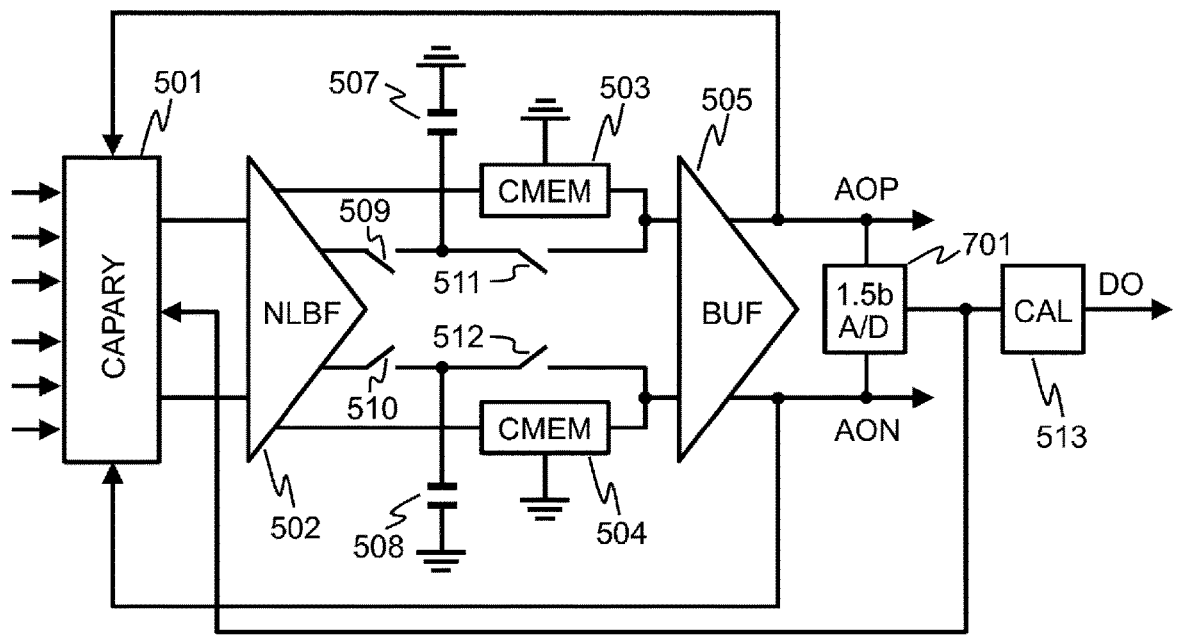
[FIG. 8]
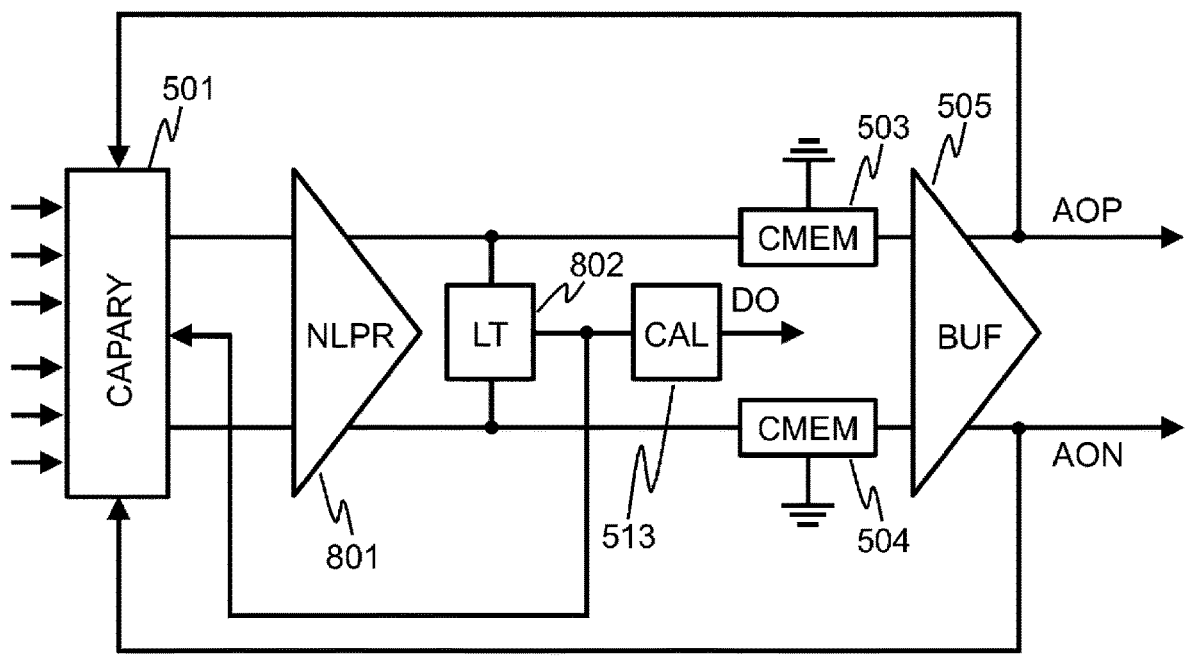

[FIG 9]
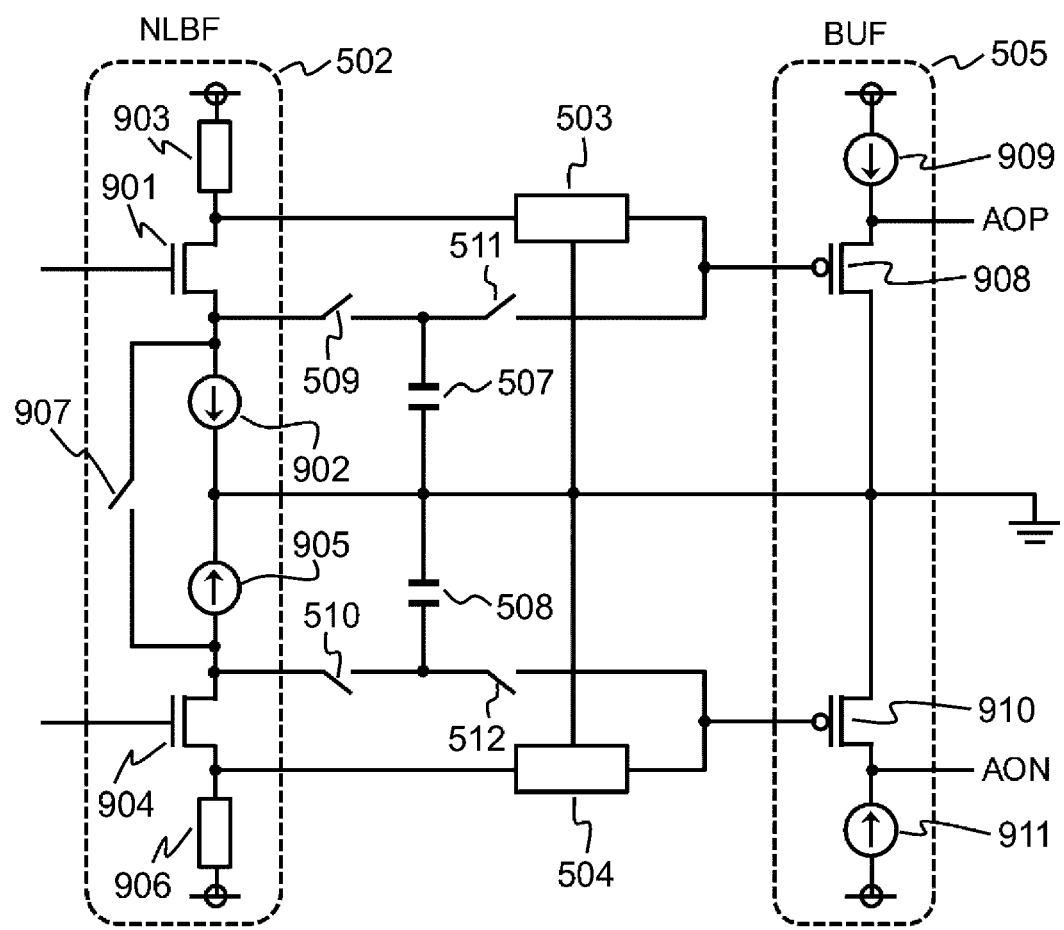

[FIG. 10]
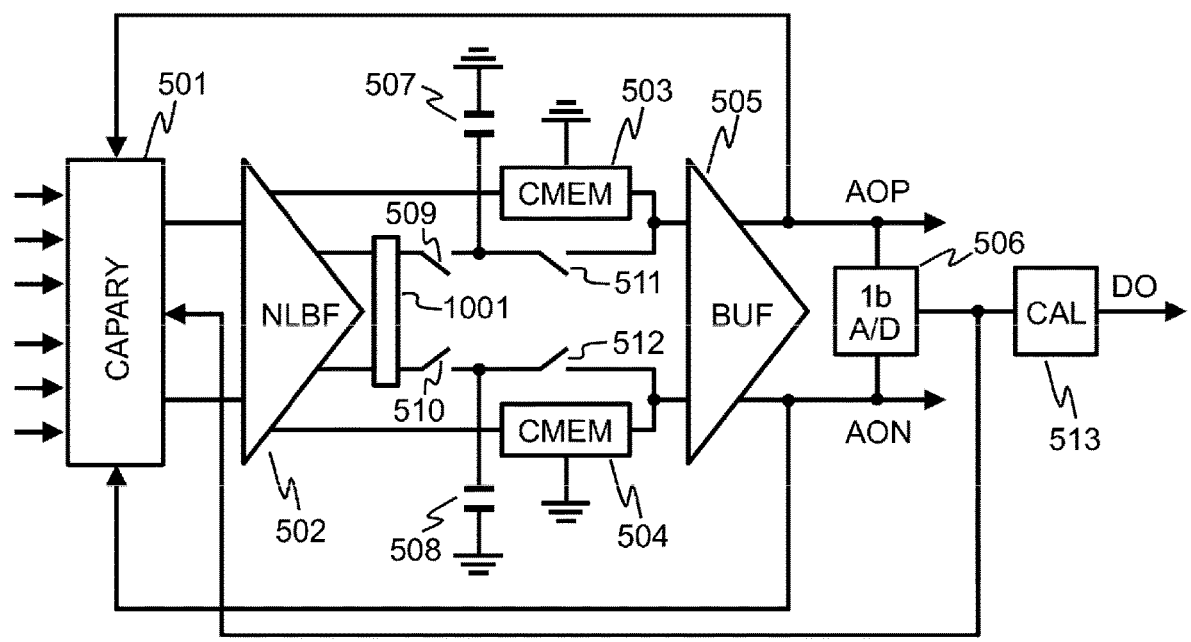

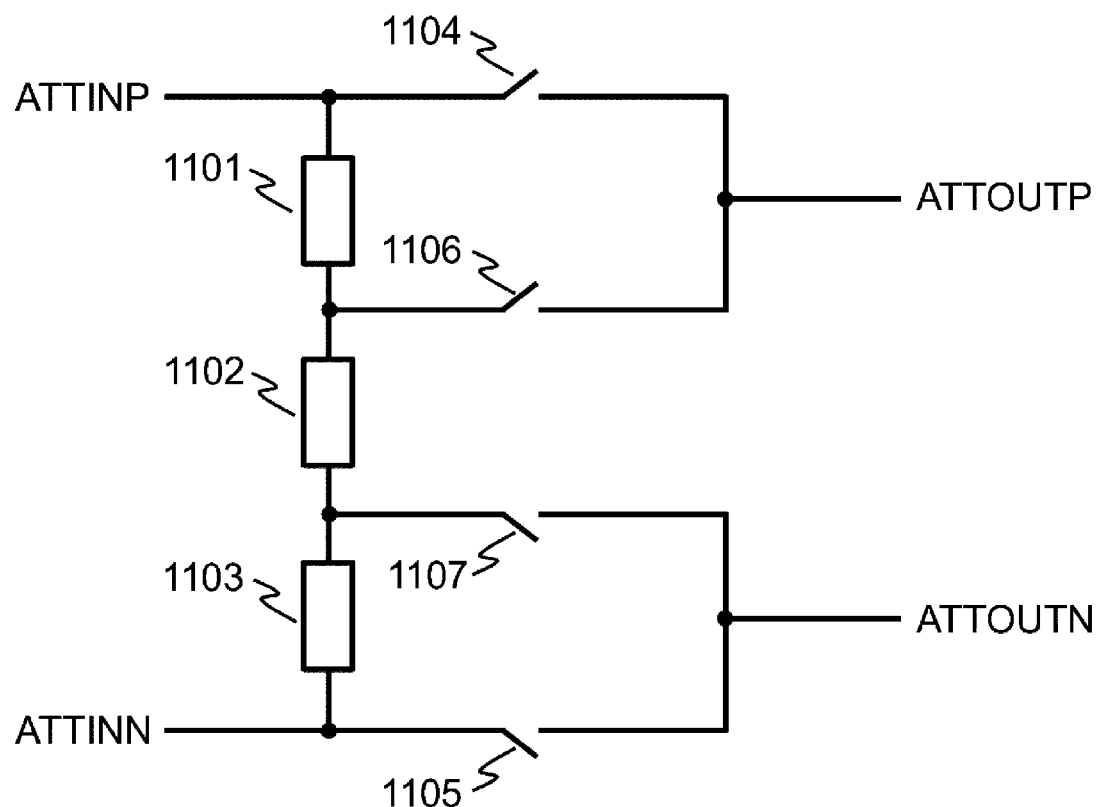
[FIG. 11]

RESERVOIR COMPUTER

CROSS-REFERENCE TO RELATED APPLICATION

The present application claims priority from Japanese application JP 2020-207523, filed on Dec. 15, 2020, the contents of which is hereby incorporated by reference into this application.

TECHNICAL FIELD

The present invention relates to a reservoir computer.

BACKGROUND ART

In Japan and abroad, maintenance of aged infrastructure facilities, factory equipment, piping, etc. has become a problem. Due to labor shortages, it is important to detect abnormalities and signs of abnormalities in these facilities and equipment, and to predict their service life. In order to detect the abnormalities and the signs of abnormalities in these facilities and equipment, it is considered to be effective to attach a vibration sensor, a gas sensor, or the like to the facilities and equipment or their surrounding environment, acquire time-series sensing signals, and apply artificial intelligence (AI) for a time-series processing to the time-series sensing signals.

In recent years, the progress of AI through deep learning has been remarkable. A recurrent neural network (RNN) and a long short-term memory (LSTM) are known as deep learning for a time series signal. Although these are effectively applied to speech recognition and translation, it has been necessary to devise learning in the related art, and it has not been easy to realize AI capable of detecting very small abnormalities and signs of abnormalities in the facilities and equipment.

On the other hand, as AI for a time series signal, reservoir computing that mimics the brain has also been known. The reservoir computing is a type of neuromorphic computing that mimics the brain. A reservoir computer is composed of a reservoir unit and an output layer. The reservoir unit is composed of a large number of neuron circuits connected to each other with random weights, and each of the neuron circuits updates output based on output of another neuron circuit or its own output. In addition, the output layer receives the output of each of the neuron circuits in the reservoir unit, and performs a product-sum calculation, thereby outputting a result of AI.

In a case of deep learning such as an RNN or an LSTM, it is necessary to take in and learn a state of each time zone traced back in the past by back propagation through time (BPTT) or the like, and thus it is not easy to learn a task with high accuracy for the time series signal. However, in the reservoir computing, since it is only necessary to learn a parameter of the output layer of one layer, it is expected that the AI that can detect the abnormalities and signs with high accuracy can be realized.

As the reservoir computer in the related art, for example, PTL 1 shows a reservoir computer using a digital circuit. In addition, a digital circuit implementation technique for the reservoir computer using a field programmable gate array (FPGA) has been known.

CITATION LIST

Patent Literature

PTL 1: JP-A-2018-67913

SUMMARY OF INVENTION

Technical Problem

However, in implementation of the reservoir computer using the digital circuit in the related art, a high-accurate calculation can be performed, but power consumption increases. Therefore, when implementing a high-accurate time series AI, there is a problem that the power consumption increases as a battery operation becomes more difficult.

On the other hand, in the related art, so-called physical reservoir computing has also been known. The physical reservoir computer is an efficient reservoir computer that makes effective use of a physical phenomenon caused by light, spin, and the like, but there are problems in terms of miniaturization and cost reduction of the computer.

On the other hand, if the reservoir computer can be implemented using an analog integrated circuit, it is considered that low power consumption, miniaturization, and cost reduction can be realized at the same time. However, in a case of the reservoir computer using the analog integrated circuit, accuracy of a task deteriorates due to noises of an analog circuit and an analog-to-digital conversion circuit. Therefore, it is necessary to sufficiently reduce these noises, but when the noises are reduced, a mounting area of the circuit becomes large and the required number of neuron circuits cannot be mounted, so that the accuracy of the task also deteriorates. As described above, the reservoir computer using the analog integrated circuit has a problem in terms of accuracy.

Therefore, a problem of the invention is to reduce a mounting area of a circuit while maintaining accuracy in a reservoir computer using an analog integrated circuit.

Solution to Problem

A preferred aspect of the invention is a reservoir computer including a reservoir unit including a plurality of neuron circuits and an output layer. The neuron circuit includes a plurality of inputs, an analog output, and a digital output. Each of the plurality of inputs is supplied with the analog output of any one of other neuron circuits, the analog output of the neuron circuit itself, or an analog input signal from the outside. The neuron circuit includes a capacitor circuit, an amplifier, a capacitor memory circuit, a buffer circuit, and an analog-to-digital conversion circuit. The capacitor circuit includes a plurality of capacitors between the plurality of inputs and a single output, performs a product-sum calculation on analog signals supplied to the plurality of inputs together with the amplifier, and performs a non-linear calculation on a result of the product-sum calculation by using saturation characteristics of the amplifier. The capacitor memory circuit has two lanes, each lane including a capacitor for storing and a switch. Each of the lanes is capable of sampling a result of the non-linear calculation output from the amplifier, storing the result as an electric charge in the capacitor for storing, and supplying a voltage to the buffer circuit based on the stored electric charge. The capacitor memory circuit alternately switches roles of the sampling and voltage supply of the two lanes. The output of the buffer circuit is the analog output of the neuron circuit. The analog-to-digital conversion circuit performs an analog-to-digital conversion on the output of the buffer circuit, and a result of the analog-to-digital conversion is the digital output of the neuron circuit. The digital output is input to the output layer, and the output layer outputs a calculation result.

Advantageous Effect

In the reservoir computer using the analog integrated circuit, it is possible to reduce the mounting area of the circuit while maintaining accuracy.

BRIEF DESCRIPTION OF DRAWINGS

FIG. 1 is a block diagram illustrating a reservoir neuron circuit according to a first embodiment.

FIG. 2 is a circuit diagram illustrating a capacitor array circuit unit according to the first embodiment.

FIG. 3 is a circuit diagram illustrating a capacitor memory unit according to the first embodiment.

FIG. 4 is a block diagram illustrating an entire reservoir computer according to the first embodiment.

FIG. 5 is a block diagram illustrating a second embodiment.

FIG. 6 is a circuit diagram illustrating a capacitor array circuit unit according to the second embodiment.

FIG. 7 is a block diagram illustrating a third embodiment.

FIG. 8 is a block diagram illustrating a fourth embodiment.

FIG. 9 is a circuit diagram illustrating a fifth embodiment.

FIG. 10 is a block diagram illustrating a sixth embodiment.

FIG. 11 is a circuit diagram illustrating an attenuation circuit according to the sixth embodiment.

DESCRIPTION OF EMBODIMENTS

Embodiments will be described in detail with reference to the drawings. However, the invention is not construed as being limited to the description of the embodiments shown below. A person skilled in the art could have easily understood that a specific configuration can be changed without departing from the idea or spirit of the invention.

In configurations of the embodiments described below, the same reference numerals are used for the same portions or portions having the same functions in common between different drawings, and redundant description may be omitted.

When there are a plurality of elements having the same or similar functions, they may be described by adding different subscripts to the same reference numerals. However, when it is unnecessary to distinguish the plurality of elements, the elements may be described by omitting the subscripts.

The terms "first", "second", "third", and the like in the present description are used to identify configuration elements, and do not necessarily limit numbers, orders, or contents thereof. Further, the numbers for identifying the configuration elements are used for each context, and the numbers used in one context do not always indicate the same configuration in other contexts. Further, it does not prevent configuration elements identified by certain numbers from having a function of configuration elements identified by other numbers.

In order to facilitate understanding of the invention, a position, a size, a shape, a range, etc. of each configuration shown in the drawings may not represent an actual position, size, shape, range, etc. Therefore, the invention is not necessarily limited to the position, size, shape, range, etc. disclosed in the drawings.

All publications, patents, and patent applications cited in the present description form a part of the present description as they are.

Configuration elements represented in a singular form in the present description shall include a plural form unless explicitly indicated in the context.

A typical example described in the following embodiments is a reservoir computer including a reservoir unit by an analog integrated circuit and an output layer by a digital integrated circuit. The reservoir unit is provided with a plurality of neuron circuits, and the neuron circuits are implemented by using a capacitor array, a switch array, and an amplifier. An analog voltage is generated by a product-sum operation using the capacitor array for an input signal of the neuron circuits and a non-linear operation due to saturation characteristics of the amplifier. The analog voltage is stored as an electric charge in a capacitor memory subsequent to the amplifier, and a voltage based on the stored electric charge is input to another neuron circuit or the neuron circuit itself, and converted into a digital value by analog-to-digital conversion, and the digital value is input to the output layer. As a further method, in the analog-to-digital conversion, the capacitor array and the amplifier are diverted, and cyclic type or successive approximation type conversion is performed to compress a circuit area. In addition, a digital correction of the analog-to-digital conversion is performed using a voltage generated by diverting the capacitor array and the amplifier.

First Embodiment

A first embodiment will be described with reference to FIGS. 1 to 4.

FIG. 1 shows a configuration of a neuron circuit of a reservoir unit in a reservoir computer of the embodiment. The neuron circuit is implemented by an analog integrated circuit. For example, a circuit to which a semiconductor technique such as FPGA is applied can be used. Further, the neuron circuit is implemented as a differential circuit for a purpose of increasing resistance to noise in a power supply line and a ground and for a purpose of doubling a signal amplitude to improve a signal-to-noise ratio. However, depending on conditions, a differential configuration may not be necessary.

A plurality of analog differential signals are input to a capacitor array circuit unit (CAPARY) 101. The input signals are analog output signals of another neuron circuit, an analog output signal of the neuron circuit itself, or an analog input signal from the outside. The number of input signals is not limited, but in the present embodiment, for example, three differential signals (INP1, INN1), (INP2, INN2), and (INP3, INN3) are input to the capacitor array circuit unit 101.

The capacitor array circuit unit 101 performs a product-sum calculation. The output of the capacitor array circuit unit 101 is input to a non-linear amplifier (NLA) 102. The non-linear amplifier 102 is a general differential amplifier and amplifies linearly with respect to a small input voltage, but as the input voltage increases, the increase in an output voltage becomes gradual due to saturation characteristics of the amplifier. That is, non-linear amplification is performed.

Differential outputs of the non-linear amplifier 102 are stored as electric charges by subsequent capacitor memory units 103 and 104. Further, a differential voltage based on the stored electric charges is output via a buffer 105.

The buffer 105 outputs the same differential outputs (however, a direct current level may be different) as differential outputs from the capacitor memory units 103 and 104. The buffer 105 can prevent the capacitor memory units 103 and 104 from being directly connected to the capacitor array circuit unit 101. When capacitors of the capacitor memory units 103 and 104 and a capacitor of the capacitor array circuit unit 101 are directly connected, electric charges in the capacitors are distributed. If an input impedance of the buffer 105 is infinite, the capacitor memory units 103 and 104 can ideally store the electric charges.

Differential outputs (AOP, AON) of the buffer 105 are analog outputs of the neuron circuit and are input to the other neuron circuit or the neuron circuit itself. At the same time, a differential output voltage of the buffer 105 is converted into a digital value (DO) by an analog-to-digital conversion circuit 106 and output as a digital output of the neuron circuit, and the digital output is input to an output layer. In addition, the analog-to-digital conversion circuit 106 requires a sufficiently high effective number of bits (ENOB) in order to reduce a conversion error.

FIG. 2 shows a configuration of the capacitor array circuit unit 101. Similar to FIG. 1, this is an example in which the three differential signals are input. The differential signals (INP1, INN1) are input to capacitors 201, 202, the differential signals (INP2, INN2) are input to capacitors 203 and 204, and the differential signals (INP3, INN3) are input to capacitors 205 and 206.

The differential signals are respectively input to the capacitors via switches 207 to 212. In addition, input sides of the capacitors can be connected to a direct current voltage VCM1 by switches 213 to 218. In addition, output sides of the capacitors are short-circuited and can be connected to a direct current voltage VCM2 by switches 219, 220.

During calculation of the reservoir computer, the switches 207 to 212 are always on, and the switches 213 to 218 and the switches 219, 220 are always off. A sampling operation to a capacitor such as an analog-to-digital conversion circuit or a switched capacitor circuit is not performed. When the sampling operation of turning on/off the switches 207 to 212 is performed, sampling noise is generated, and thus in order to reduce the sampling noise, a capacitor having a large capacitance value is required, which hinders miniaturization of the circuit. That is, the capacitor array circuit unit 101 of the present embodiment avoids the generation of sampling noise by performing a continuous-time operation instead of a discrete-time operation.

In a differential output node of the capacitor array circuit unit 101, a product-sum calculation result for each differential input signal (that is, an output signal equivalent to a result obtained by multiplying each input signal by a weight coefficient and calculating a sum of multiplication results) is generated.

Weight coefficients for the differential input signals (INP1, INN1) are set by capacitance values of the capacitors 201 and 202. Weight coefficients for the differential input signals (INP2, INN2) are set by capacitance values of the capacitors 203 and 204. Weight coefficients for the differential input signals (INP3, INN3) are set by capacitance values of the capacitors 205 and 206. For example, the weight coefficients may be randomly determined and set at a time of design, and may not be changed thereafter.

In addition, when it is necessary to further uniformly increase weight coefficient values of the product-sum calculation, the weight coefficient values of the product-sum calculation can be increased by a gain of the subsequent non-linear amplifier 102. That is, the weight coefficient values of the product-sum calculation of the neuron circuit can be set to a value obtained by multiplying the weight coefficient values of the product-sum calculation in the capacitor array circuit unit 101 by the gain of the non-linear amplifier 102.

In addition, when the product-sum calculation is implemented by using a resistor instead of the capacitor, noise of the resistor becomes a problem. If a resistance value is reduced in order to reduce the noise of the resistor, a load on the buffer 105 becomes heavier, so that power consumption of the buffer 105 increases and a merit in terms of power implemented in the analog integrated circuit weakens. Therefore, as described above, it is desirable to perform the product-sum calculation using the capacitor.

In addition, it is necessary to keep the sum of electric charges held in the output node (that is, the sum of electric charges of the capacitor) constant in order to ensure a stable operation and accuracy of the product-sum calculation. Since the output node is connected to input of the non-linear amplifier 102, the non-linear amplifier 102 has a configuration in which the input impedance is high impedance (or capacitive impedance).

For example, a source-grounded differential amplifier, which is a general differential amplifier, is suitable because a gate of a metal-oxide-semiconductor (MOS) transistor pair is used as an input and the input impedance is the high impedance. However, even in this case, a leak current is generated in the output node due to factors such as a gate leakage of the MOS transistor, and the sum of electric charges stored in the output node gradually changes with time.

Therefore, the switches 207 to 212 and the switches 219 and 220 are turned on at the same time to charge the capacitors 201 to 206 with the electric charges, and then turned off to reset the sum of electric charges stored in the output node. The sum of electric charges to be reset depends on the VCM1 and VCM2. For example, when the VCM1 is selected equal to an output in-phase voltage (that is, an output direct current voltage level) of the buffer 105, the output of the capacitor array circuit unit 101, that is, an input in-phase voltage (a direct current voltage level) of the non-linear amplifier 102 becomes about the VCM2. Therefore, for example, the VCM1 may be selected as a design value of the output in-phase voltage (the output direct current voltage level) of the buffer 105, and the VCM2 may be selected as a design value of the input in-phase voltage (the input direct current voltage level) of the non-linear amplifier 102.

The reset operation may be performed at any timing required depending on degree of leakage. During the calculation of the reservoir computer, the sum of electric charges decrease or increase little by little due to the leakage, and therefore the reset operation is performed at a timing at which the sum of electric charges deviates from an allowable range, that is, at a timing at which task accuracy is affected. The timing may be determined in advance by investigating a required timing, for example, by an experiment. Since the calculation of the reservoir computer cannot be performed during the reset operation, the calculation is temporarily interrupted, and the calculation is restarted after the reset.

As described above, the switches 219 and 220 are necessary for the reset operation, but they themselves also cause a leakage. That is, while the switches 219 and 220 are off during the calculation of the reservoir computer, since the switches are implemented by the MOS transistor, the sum of electric charges is changed by a sub-threshold leakage current of the MOS transistor. As the number of such leakages decreases, frequency of the reset operation can be reduced, so that a continuous calculation period from one reset operation to a next reset operation becomes longer. Therefore, a task for a time series signal can be executed continuously for a longer time. For example, by implementing the switches 219 and 220 using MOS transistors having a higher threshold voltage than the other switches 207 to 212, the leakage current may be reduced and the continuous calculation period may be lengthened.

The switches 207 to 212 are turned off during the reset operation to isolate the differential input signals. During the calculation of the reservoir computer, the switches 207 to 212 are turned on in order to input the input signals to the capacitors, and therefore it is necessary to reduce an influence of thermal noise due to on-resistance of these switches. Therefore, gate width of the MOS transistors on which the switches are implemented is increased to a necessary extent to reduce the on-resistance. In addition, by not performing the sampling operation as described above, it is possible to reduce the influence of the thermal noise caused by the switches 207 to 212.

FIG. 3 shows a configuration of the capacitor memory unit 103 (the configuration of the capacitor memory unit 104 is also the same). As shown in the figure, the capacitor memory unit has two lanes in which one capacitor and two switches are arranged in a "T shape". That is, a first lane is composed of a capacitor 301 and switches 302 and 303, and a second lane is composed of a capacitor 304 and switches 305 and 306.

One of the two lanes is used to sample an output voltage of the non-linear amplifier 102 and store the sampled voltage as an electric charge, and the other one is used to supply a voltage based on the stored electric charge to input of the buffer 105. The two lanes change roles by switching the switches, for example, every clock, so that the capacitor memory unit 103 has a function of temporarily storing an input signal.

In a case where the first lane performs sampling, the switch 302 is turned on and the switch 303 is turned off. In addition, in a case where the second lane performs sampling, the switch 305 is turned on and the switch 306 is turned off. In a case where the first lane supplies a voltage, the switch 302 is turned off and the switch 303 is turned on. In addition, in a case where the second lane supplies a voltage, the switch 305 is turned off and the switch 306 is turned on.

In a case where the first lane performs the sampling and the second lane supplies a voltage to the buffer 105, the second lane performs a next sampling, and the first lane supplies a voltage based on the electric charge sampled immediately before to the buffer 105. Further, the first lane performs a further next sampling, and the second lane supplies a voltage based on the electric charge sampled immediately before to the buffer 105.

In this way, by alternately switching the roles of the first lane and the second lane, it is possible to seamlessly continue the sampling of the output voltage of the non-linear amplifier 102 and the supply of the voltage to the input of the buffer 105. In addition, two capacitor memory units 103 and 104 are provided corresponding to the differential output of the non-linear amplifier 102.

Since the capacitors 301 and 304 are connected to the output nodes of the non-linear amplifier 102, the capacitors 301 and 304 also serve as filters that narrow a frequency band of the non-linear amplifier 102. In addition, the frequency band of the non-linear amplifier 102 needs to be wide enough so that a transient response of the output thereof can be converged in each sampling. An additional capacitor may be always connected to the output of the non-linear amplifier 102 to narrow the frequency band to required minimum limit. By narrowing the frequency band of the non-linear amplifier 102, it is possible to sufficiently limit a band of a wideband noise generated in the switches 207 to 212 of the capacitor array circuit unit 101 in the non-linear amplifier 102. Since the noise generated by these switches is amplified by the gain of the non-linear amplifier 102, it is important to reduce the noise by the band limitation.

FIG. 4 shows an overall configuration of the reservoir computer of the present embodiment. The reservoir computer includes a reservoir unit (RSV) 401 and an output layer (FINAL) 402 following the reservoir unit (RSV) 401. In this figure, there are two analog inputs to the reservoir unit 401 and four outputs from the output layer 402, but the invention is not limited to this example.

The reservoir unit 401 includes a large number of the neuron circuits (FIG. 1). As described above, each of the neuron circuits has an analog output and a digital output, and the analog output (not shown in FIG. 4) is input to another neuron circuit or the neuron circuit itself. In addition, the digital output 403 is input to the output layer 402. Since the analog output and the digital output basically need to have the same value, a high-accurate analog-to-digital conversion is required.

Since the reservoir unit 401 includes the large number of neuron circuits, the reservoir unit 401 is implemented by the analog integrated circuit as described above in order to reduce the power consumption. Changes in characteristics of the neuron circuits of the reservoir unit 401 due to manufacturing variations of circuit elements such as a MOS transistor and a capacitor, temperature fluctuations, and power supply voltage fluctuations are compensated for by the weight coefficient values of neuron circuits of the output layer 402.

Since the output layer 402 needs to perform the compensation with high accuracy, the output layer 402 is implemented by a digital integrated circuit. Since the number of neuron circuits in the output layer 402 is smaller than the number of neuron circuits in the reservoir unit 401, the power consumption of the output layer 402 is sufficiently small even if the output layer 402 is implemented by the digital integrated circuit. A configuration of the output layer 402 may follow a known configuration of the reservoir computer.

By the configuration and operation described with reference to FIGS. 1 to 3, each of the neuron circuits of the reservoir unit 401 can be implemented with low-noise, a small mounting area, and low-power consumption. As a result, a large number of low-noise neuron circuits can be integrated in the reservoir unit 401. Therefore, according to the present embodiment, it is possible to realize a small, low-cost, low-power consumption reservoir computer capable of executing a high-accurate time series AI.

Second Embodiment

A second embodiment will be described with reference to FIGS. 5 and 6.

FIG. 5 shows a configuration of a neuron circuit of a reservoir unit in the reservoir computer of the present embodiment. In the present embodiment, a cyclic type analog-to-digital conversion circuit is applied as the analog-to-digital conversion circuit 106 in the first embodiment, and the analog-to-digital conversion circuit 106 is configured with a capacitor array circuit unit, a non-linear amplifier, and a buffer.

Similar to the first embodiment, a plurality of differential signals are input to a capacitor array circuit unit 501, and the capacitor array circuit unit 501 outputs product-sum calculation results for those inputs. The output of the capacitor array circuit unit 501 is input to a non-linear amplifier/buffer (NLBF) 502.

The non-linear amplifier/buffer 502 first functions as a non-linear amplifier, and an operation thereof is as described in the first embodiment. The differential output of the non-linear amplifier/buffer 502 as the non-linear amplifier is connected to capacitor memory units 503 and 504.

The capacitor memory units 503 and 504 have configurations illustrated in FIG. 3 and perform the same operation as in the first embodiment. That is, a differential output voltage of the non-linear amplifier is sampled and stored as an electric charge, while the voltage based on the electric charge is supplied to input of a buffer 505.

The buffer 505 first plays a role of driving an analog-to-digital conversion circuit. The analog-to-digital conversion circuit is configured by using a 1-bit analog-to-digital conversion unit (1b A/D) 506, the diverted capacitor array circuit unit 501, the diverted non-linear amplifier/buffer 502, capacitors 507 and 508, switches 509 to 512, the diverted buffer 505, and a digital correction unit (CAL) 513, and performs cyclic type analog-to-digital conversion.

In the cyclic type analog-to-digital conversion, for example, as described in JP-A-2015-198432 "an analog digital converter, a diagnostic probe, and a medical diagnostic system", conversion is performed bit by bit in one cycle from high-order bits. In that case, in each cycle, 1-bit analog-to-digital conversion for input of each cycle, sampling for the input, and residual amplification based on a result of the 1-bit analog-to-digital conversion are performed.

The residual amplification is to amplify a residual (difference) between an analog original signal obtained by sampling and a voltage corresponding to a 1-bit digital value obtained by the analog-to-digital conversion. A result of the residual amplification is sampled as a next analog original signal, and multi-bit conversion is performed by repeating the 1-bit analog-to-digital conversion.

In the present embodiment, the 1-bit analog-to-digital conversion is performed by a 1-bit analog-to-digital conversion unit 506, and the sampling and the residual amplification are performed by the capacitor array circuit unit 501. Therefore, for example, a capacitor circuit configuration capable of voltage amplification shown in JP-A-2015-198432 is applied to the capacitor array circuit unit 501.

Hereinafter, the details of the cyclic type analog-to-digital conversion of the present embodiment will be described. As described above, voltages supplied from the capacitor memory units 503 and 504 are input to the analog-to-digital conversion circuit via the buffer 505.

In a first cycle, a differential output voltage of the buffer 505 is converted to a binary (1 or −1) digital value by the 1-bit analog-to-digital conversion unit 506. In addition, the differential output voltage is sampled by the capacitor array circuit unit 501. After the sampling is completed, the switches 303 (or 306) in the capacitor memory units 503 and 504 are turned off. As a result, an electric charge stored in the capacitor 301 (or 304) can be maintained.

Subsequently, the capacitor array circuit unit 501 performs residual amplification based on the digital value output from the 1-bit analog-to-digital conversion unit 506, and outputs a result as a differential output voltage.

The non-linear amplifier/buffer 502 operates as a buffer this time and differentially outputs a voltage equal to the differential output voltage. At this time, the switches 509 and 510 are turned on, and the switches 511 and 512 are turned off. Therefore, the differential output of the non-linear amplifier/buffer 502 as the buffer is connected to the capacitors 507 and 508 via the switches 509 and 510, and these capacitors are charged.

After the capacitor is fully charged, the switches 509 and 510 are turned off and electric charges are sampled on the capacitors 507 and 508. Further, when the switches 511 and 512 are turned on, a voltage based on the sampled electric charge is input to the buffer 505.

Thus, the first cycle is completed. In a next cycle, output (residual amplification result) of the buffer 505 is fed back to the capacitor array circuit unit 501 and sampled. After that, the same cycle is repeated according to the required number of bits of the analog-to-digital conversion circuit. The binary digital value output by the 1-bit analog-to-digital conversion unit 506 in each cycle is supplied to the digital correction unit 513. The output of the buffer 505 during the analog-to-digital conversion is not analog output from the neuron circuit.

The digital correction unit 513 is implemented as a digital integrated circuit, performs a correction calculation by a generally known method using the digital value, and inputs a result (DO) to an output layer as an output of the analog-to-digital conversion circuit.

After the analog-to-digital conversion is completed, the switches 303 (or 306) in the capacitor memory units 503 and 504 are turned on again. As a result, a differential voltage based on the electric charge stored in the capacitor 301 (or 304) is output via the buffer 505. Differential outputs (AOP, AON) of the buffer 505 are the analog output of the neuron circuit and are input to other neuron circuits or the neuron circuit itself.

FIG. 6 shows a configuration of the capacitor array circuit unit 501. Similar to the first embodiment, the sampling operation is not performed, and the product-sum calculation is performed by a continuous-time operation. That is, switches 607 to 612 are always on during the calculation. Further, the reset operation is performed in the same manner as in the first embodiment.

Unlike the capacitor array circuit unit 101 of the first embodiment, the capacitor array circuit unit 501 has a large number of capacitors (unit capacitors) having the same small capacitance value (unit capacitors 601 to 606). In addition, the capacitor array circuit unit 501 has a correspondingly large number of differential input nodes ((IP1, IN1) to (IPM, INM)).

The unit capacitors 601 to 606 are connected to the input nodes via the switches 607 to 612, respectively. In addition, the unit capacitors 601 to 606 are connected to output nodes via switches 613 to 618, respectively.

A differential output voltage (AOP, AON) of the buffer 505, a reference voltage (for example, a power supply voltage and a ground voltage) for analog-to-digital conversion, and a direct current voltage for a reset operation can be connected to both ends of each of the unit capacitors 601 to 606. These connections are controlled by a connection control unit (CNCT) 619. The connection control unit 619 controls the connections based on the digital value output by the 1-bit analog-to-digital conversion unit 506 at the time of the analog-to-digital conversion.

As described above, by providing a large number of configurations including the unit capacitors and the switches before and after the unit capacitors in parallel, the capacitor array circuit unit 501 can be shared for the product-sum calculation and the analog-to-digital conversion. That is, by connecting analog output of the other neuron circuit, the analog output of the neuron circuit itself, or analog input from the outside to a necessary number of differential input nodes in accordance with a weight coefficient value of the product-sum calculation, a circuit configuration is the same as that of the capacitor array circuit unit 101 (FIG. 2), and thus the product-sum calculation can be performed in the same manner.

In addition, the sampling of the differential output voltage of the buffer 505 performed in each cycle of the cyclic type analog-to-digital conversion is performed by the connection control unit 619 connecting the differential output voltage (AOP, AON) to each of the unit capacitors and using a capacitor array as one capacitor.

In addition, in the residual amplification performed after the sampling, the connection control unit 619 appropriately connects any one of the reference voltages (for example, the power supply voltage and the ground voltage) to each of the unit capacitors based on the digital value output from the 1-bit analog-to-digital conversion unit 506, thereby subtracting a digitized value from a sampled capacitor. Amplification twice the residual amplification is equivalently performed when the differential output of the buffer 505 is sampled to the capacitor of the capacitor array circuit unit 501. In normal sampling, either of the differential signals is applied to one electrode of each capacitor, and a ground is connected to another electrode. With respect to this, as described in PTL 2, at the time of sampling the residual amplification of the present embodiment, a positive phase signal of the differential signals (the differential output of the buffer 505) is connected to the one electrode of each capacitor, and a negative phase signal is connected to the other electrode. As a result, twice normal electric charges are sampled, so that an effect of doubling the signal can be obtained. Then, as described above, by connecting the capacitor to an appropriate reference voltage, the output after residual (twice) amplification is obtained for the differential output of the capacitor array circuit unit 501. Therefore, in an AD conversion mode, the NLBF 502 operates as a buffer with a 1× gain.

The reset operation is performed by the connection control unit 619 connecting an appropriate direct current voltage for reset to both ends of each of the unit capacitors to charge the unit capacitors. For example, similar to the capacitor array circuit unit 101 in the first embodiment, a direct current voltage connected to an input-side terminal of each of the unit capacitor is set to about a design value of an output in-phase voltage (an output direct current voltage level) of the buffer 505, and a direct current voltage connected to an output-side terminal is set to about a design value of an input in-phase voltage (a direct current voltage level) of the non-linear amplifier/buffer 502.

As in the first embodiment, the reservoir computer of the present embodiment is configured as shown in FIG. 4. The reservoir unit 401 includes the neuron circuits described above. The reservoir unit 401 and an output layer 402 operate in the same manner as in the first embodiment.

As described above, in the present embodiment, since the analog-to-digital conversion circuit in the neuron circuit of the first embodiment can be configured by diverting the capacitor array circuit unit, the non-linear amplifier, and the buffer, the neuron circuit can be implemented in a smaller area than that of the first embodiment. As a result, more neuron circuits can be integrated in the reservoir unit. Therefore, it is possible to realize the reservoir computer capable of executing a more accurate or more advanced time series AI.

Third Embodiment

A third embodiment will be described with reference to FIG. 7.

FIG. 7 shows a configuration of a neuron circuit of the present embodiment. A difference from the second embodiment is that the 1-bit analog-to-digital conversion unit 506 is replaced with a 1.5-bit analog-to-digital conversion unit (1.5b A/D) 701.

In the present embodiment, for example, a cyclic type analog-to-digital conversion is performed by using the 1.5-bit analog-to-digital conversion unit 701 according to the configuration shown in JP-A-2015-198432. That is, the differential output voltage of the buffer 505 is converted into a ternary (1, or 0, or −1) digital value by the 1.5-bit analog-to-digital conversion unit 701.

The capacitor array circuit unit 501 and the digital correction unit 513 operate in the same manner as the capacitor array circuit unit and the digital correction unit of the second embodiment in a form corresponding to the ternary digital value. Further, other parts also operate in the same manner as in the second embodiment.

In the present embodiment, by applying the 1.5-bit analog-to-digital conversion unit, a circuit design becomes a little complicated, but power consumption at a time of a buffer operation of the non-linear amplifier/buffer 502 and power consumption of the buffer 505 can be reduced as compared with the case where the 1-bit analog-to-digital conversion unit is applied.

Fourth Embodiment

A fourth embodiment will be described with reference to FIG. 8. In the present embodiment, the cyclic type analog-to-digital conversion in the second embodiment is replaced with a successive approximation type analog-to-digital conversion. Therefore, the non-linear amplifier/buffer 502 in the second embodiment is replaced with a non-linear amplifier/preamplifier 801 and a latch circuit 802 is connected to output thereof.

At the time of analog-to-digital conversion, the non-linear amplifier/preamplifier 801 is operated as a preamplifier, and is operated as a comparison circuit (comparator) in combination with a subsequent latch operation by a latch circuit 803.

As in the case of the cyclic type analog-to-digital conversion, a conversion is performed bit by bit in order from high-order bits, and a conversion result for each bit is output from the latch circuit 803 as a binary (1 or −1) digital value. This binary digital value corresponds to the binary digital value output by the 1-bit analog-to-digital conversion unit 506 in the second embodiment.

FIG. 8 shows a configuration of a neuron circuit of a reservoir unit in the reservoir computer of the present embodiment. In the present embodiment, as described above, a successive approximation type analog-to-digital conversion circuit is applied as the analog-to-digital conversion circuit 106 in the first embodiment, and the successive approximation type analog-to-digital conversion circuit is configured by diverting a capacitor array circuit unit and a non-linear amplifier.

Similar to the first embodiment, a plurality of differential signals are input to a capacitor array circuit unit 501, and the capacitor array circuit unit 501 outputs product-sum calculation results for those inputs. The output of the capacitor array circuit unit 501 is input to the non-linear amplifier/preamplifier (NLPR) 801.

The non-linear amplifier/preamplifier 801 first functions as a non-linear amplifier, and an operation thereof is as described in the first embodiment. Differential output of the non-linear amplifier/preamplifier 801 is connected to the capacitor memory units 503 and 504.

The capacitor memory units 503 and 504 have configurations illustrated in FIG. 3 and perform the same operation as in the first embodiment. That is, a differential output voltage of the non-linear amplifier is sampled and stored as an electric charge, while the voltage based on the electric charge is supplied to the input of the buffer 505.

The buffer 505 plays a role of generating the analog output of the neuron circuit and driving the analog-to-digital conversion circuit. The analog-to-digital conversion circuit is configured by using the diverted capacitor array circuit unit 501, the diverted non-linear amplifier/preamplifier 801, the latch circuit 802, and a digital correction unit (CAL) 513, and performs successive approximation type analog-to-digital conversion.

Even in the successive approximation type analog-to-digital conversion, conversion is performed bit by bit in one cycle from high-order bits. First, an input voltage of the analog-to-digital conversion circuit, that is, the differential output voltage of the buffer 505 is sampled by the capacitor array circuit unit 501.

Subsequently, in order to enter a first cycle and perform conversion of a first bit, each of the unit capacitors in the capacitor array circuit unit 501 is appropriately connected to any one of reference voltages (for example, a power supply voltage and a ground voltage) according to a normal successive approximation type analog-to-digital conversion.

As a result, a residual voltage for conversion of the first bit is generated in a differential output node of the capacitor array circuit unit 501. In the successive approximation type analog-to-digital conversion, it is necessary to determine whether the residual voltage similarly generated in each cycle is a positive value or a negative value by a comparison circuit.

The comparison circuit is usually composed of a preamplifier and a latch circuit following the preamplifier. By providing the preamplifier in front of the latch circuit, it is possible to reduce an influence of noise of the latch circuit, a direct current offset voltage, and a dynamic offset voltage on the determination. In the present embodiment, at the time of analog-to-digital conversion, the non-linear amplifier/preamplifier 801 is operated as the preamplifier, and combined with the subsequent latch circuit 802 to realize the operation of the comparison circuit.

That is, the non-linear amplifier/preamplifier 801 amplifies the residual voltage as a preamplifier and outputs the residual voltage as a differential voltage. The latch circuit 802 outputs a binarized value (either 1 or 0, or either 1 or −1) based on whether the differential voltage is a positive value or a negative value.

As described above, the first cycle is completed. Subsequently, a second cycle is entered, and conversion of a second bit is performed. Therefore, based on the binarized value obtained in the first cycle, each of the unit capacitors in the capacitor array circuit unit 501 is appropriately connected to one of reference voltages (for example, a power supply voltage and a ground voltage) in accordance with normal successive approximation type analog-to-digital conversion. As a result, a residual voltage for conversion of the second bit is generated at the differential output node of the capacitor array circuit unit 501.

Therefore, similarly to the first cycle, the binarized value for the second cycle is generated as output of the latch circuit 802 by the comparison circuit using the non-linear amplifier/preamplifier 801 and the latch circuit 802.

After that, the same cycle is repeated according to the required number of bits of the analog-to-digital conversion circuit. The binarized value for each cycle is supplied to the digital correction unit 513. The digital correction unit 513 is implemented as a digital integrated circuit, performs a correction calculation by a generally known method using the binarized value, and the result (DO) is input to an output layer as an output of the analog-to-digital conversion circuit.

The capacitor array circuit unit 501 is configured as illustrated in FIG. 6, and performs a reset operation, a product-sum calculation, and an analog-to-digital conversion operation by appropriately turning on and off the switch as in the second embodiment.

Similar to the first embodiment, the reservoir computer of the present embodiment is configured as shown in FIG. 4. The reservoir unit 401 includes the neuron circuit described above. The reservoir unit 401 and the output layer 402 operate in the same manner as in the first embodiment.

As described above, in the present embodiment, since the analog-to-digital conversion circuit in the neuron circuit of the first embodiment can be configured by diverting the capacitor array circuit unit and the non-linear amplifier, the neuron circuit can be implemented in a smaller area than that of the first embodiment. As a result, more neuron circuits can be integrated in the reservoir unit. Therefore, it is possible to realize the reservoir computer capable of executing a more accurate or more advanced time series AI.

In addition, since a preamplifier operation of the non-linear amplifier/preamplifier 801 according to the present embodiment has lower power consumption than a buffer operation of the non-linear amplifier/buffer 502 according to the second embodiment, the neuron circuit according to the present embodiment has lower power consumption than the neuron circuit according to the second embodiment. On the other hand, regarding a circuit mounting area, the neuron circuit of the present embodiment can be made smaller than that of the neuron circuit of the second embodiment. Therefore, in the present embodiment, a lower power consumption reservoir computer can be realized, while in the second embodiment, the reservoir computer having a larger number of neuron circuits, that is, capable of executing more advanced time series AI can be realized.

Fifth Embodiment

A fifth embodiment will be described with reference to FIG. 9.

In the present embodiment, the non-linear amplifier/buffer 502 and the buffer 505 in the second embodiment are implemented by a simple analog integrated circuit. When the non-linear amplifier/buffer 502 operates as a non-linear amplifier, the non-linear amplifier/buffer 502 operates as a general fully differential source grounded amplifier. In addition, when the non-linear amplifier/buffer 502 operates as a buffer, the non-linear amplifier/buffer 502 operates as a general pseudo-differential source follower circuit.

When the non-linear amplifier/buffer 502 is operated as a source grounded amplifier, a switch 907 is turned on in order to short-circuit source nodes of NMOS transistors 901 and 904. At this time, an NMOS input type fully differential source grounded amplifier is formed by a tail current source of a current value obtained by adding current values of NMOS current sources 902 and 905.

Resistors 903 and 906 are loads of the source grounded amplifier. Output of the non-linear amplifier/buffer 502 as a non-linear amplifier is a differential output node of the source grounded amplifier, that is, a drain node of the NMOS transistors 901 and 904, and these are connected to the capacitor memory units 503 and 504.

When the non-linear amplifier/buffer 502 operates as a source follower circuit, the switch 907 is turned off. At this time, single-ended source follower circuits are respectively configured by the NMOS transistor 901 and the NMOS current source 902, and the NMOS transistor 904 and the NMOS current source 905, and as a whole, the single-ended source follower circuits become an NMOS input type pseudo-differential source follower circuit. Output of the non-linear amplifier/buffer 502 as a buffer is a differential output node of the source follower circuit, that is, source nodes of the NMOS transistors 901 and 904, and these are connected to switches 509 and 510.

Sizes (gate lengths or gate widths) of the NMOS transistors 901 and 904, the current values of the NMOS current sources 902 and 905, resistance values of the resistors 903 and 906, capacitance values of capacitors in the capacitor memory units 503 and 504, capacitance values of capacitors 507 and 508, and the like are set in consideration of a gain required for the non-linear amplifier, saturation (non-linear) characteristics, an output in-phase voltage (an output direct current voltage level), a response speed, a response speed required for the buffer, and the like of the non-linear amplifier/buffer 502.

The buffer 505 is also a pseudo-differential source follower circuit. Since an operation of the non-linear amplifier/buffer 502 at the time of buffering is performed by a NMOS input type source follower circuit, the output in-phase voltage (the output direct current voltage level) is lowered due to the direct current voltage drop. Therefore, the buffer 505 applies a PMOS input type source follower circuit suitable for a low input in-phase voltage (an input direct current voltage level).

At shown in FIG. 9, single-ended source follower circuits are respectively configured by a PMOS transistor 908 and a PMOS current source 909, and a PMOS transistor 910 and a PMOS current source 911, and as a whole, the single-ended source follower circuits become a PMOS input type pseudo-differential source follower circuit.

In addition, when the output in-phase voltage (the output direct current voltage level) during the non-linear amplifier operation of the non-linear amplifier/buffer 502 is too high or too low, the in-phase voltage (direct current voltage level) may be adjusted by the capacitor memory units 503 and 504. For example, in the configuration of the capacitor memory unit shown in FIG. 3, when sampling the output of the non-linear amplifier/buffer 502 (when the switches 302 and 305 are turned on), lower ends of the capacitors 301 and 304 are connected to a direct current voltage higher than a ground voltage, and when a voltage is supplied to the input of the buffer 505 (when the switches 303 and 306 are turned on), the lower ends of the capacitors 301 and 304 are connected to the ground voltage, so that an in-phase voltage (a direct current voltage level) of the differential input signal of the buffer 505 can be reduced.

As described above, according to the present embodiment, since the non-linear amplifier/buffer 502 and the buffer 505 can be realized with a simple circuit configuration, a mounting area and power consumption of the neuron circuit can be reduced. As a result, more neuron circuits can be integrated in the reservoir unit. Therefore, it is possible to realize the reservoir computer capable of executing a more accurate or more advanced time series AI. In addition, similarly, the non-linear amplifier/preamplifier 801 and the buffer 505 in the fourth embodiment also can be implemented by a simple analog integrated circuit. The non-linear amplifier/preamplifier 801 includes a switch for switching a configuration, and using the switch for switching the configuration, switches to a configuration of a source grounded amplifier when a product-sum calculation is performed, and switches to a configuration of a preamplifier when analog-to-digital conversion is performed.

Sixth Embodiment

A sixth embodiment will be described with reference to FIGS. 10 and 11.

As described above, the neuron circuit in the reservoir unit 401 performs an analog-to-digital conversion. When a cyclic type analog-to-digital conversion is performed, a digital correction unit 513 performs a correction calculation using a binary digital value output from a 1-bit analog-to-digital conversion unit 506 for each cycle, and an analog-to-digital conversion result is obtained. In the correction calculation, a set of correction coefficients is used. In the present embodiment, in order to obtain an appropriate set of correction coefficients in advance, in particular, a method disclosed in WO-A1-2014/207870 "analog-digital converter" is used.

In the method disclosed in WO-A1-2014/207870, a large number of voltage pairs having a constant ratio to each other are input to an analog-to-digital conversion circuit in a time series order. The analog-to-digital conversion circuit outputs a digital value of a conversion result of each bit for these input voltages. By using these digital values, it is possible to search for and acquire an appropriate set of correction coefficients. In addition, in the case of the cyclic type analog-to-digital conversion, the digital value is the binary digital value output by the 1-bit analog-to-digital conversion unit 506.

In the present embodiment, the large number of voltage pairs are generated by diverting the capacitor array circuit unit 501 and the non-linear amplifier/buffer 502. Further, as shown in FIG. 10, an attenuation circuit 1001 is connected to buffer differential output nodes of the non-linear amplifier/buffer 502 in order to generate the voltage pairs having the constant ratio to each other.

During a period for obtaining a set of correction coefficients, the capacitor array circuit unit 501 (FIG. 6) outputs many different voltages for a certain period of time T. During the period, switches 607 to 612 of the capacitor array circuit unit 501 are turned off to block an input signal of the neuron circuit. In addition, switches 613 to 618 are turned on, and each of unit capacitors is connected to a differential output node of the capacitor array circuit unit 501.

During the period, the connection control unit 619 connects one of reference voltages (for example, a power supply voltage and a ground voltage) to an input-side terminal of each of the unit capacitors. By switching the reference voltages connected to the unit capacitors, the capacitor array circuit unit 501 outputs many different voltages described above.

Further, the connection control unit 619 prevents the reference voltages or the like from being connected to an output-side terminal of each of the unit capacitors. Further, before the above period, a reset operation of the capacitor array circuit unit 501 is performed in the same manner as in the second embodiment.

During the period, the non-linear amplifier/buffer 502 operates as a buffer and supplies the voltage output from the capacitor array circuit unit 501 to the attenuation circuit 1001.

FIG. 11 shows a configuration of the attenuation circuit 1001. The buffer differential output nodes of the non-linear amplifier/buffer 502 are connected to differential input nodes (ATTINP, ATTINN) of the attenuation circuit 1001.

The attenuation circuit 1001 divides an input differential voltage using resistors 1101, 1102, and 1103. A resistance value of the resistor 1101 and a resistance value of the resistor 1103 are selected to be equal. The divided differential voltage is generated at both ends of the resistor 1102. A voltage division ratio is appropriately set by a ratio of the resistance value of the resistor 1101 to a resistance value of the resistor 1102.

Switches 1104 to 1107 select whether to supply a differential input voltage of the attenuation circuit 1001 to differential output nodes (ATTOUTP, ATTOUTN) of the attenuation circuit 1001 without dividing the differential input voltage of the attenuation circuit 1001, or to supply the divided differential voltage. That is, when the switches 1104 and 1105 are turned on and the switches 1106 and 1107 are turned off, the differential input voltage of the attenuation circuit 1001 is supplied to the differential output nodes of the attenuation circuit 1001, and when the switches 1106 and 1107 are turned on and the switches 1104 and 1105 are turned off, the divided differential voltage is supplied to the differential output node of the attenuation circuit 1001.

During the period, this switching is performed alternately. That is, in a time width of the certain period of time T, for example, in a first half time (a time width of T/2), the switches 1104 and 1105 are turned on, and in a second half time (a time width of T/2), the switches 1106 and 1107 are tuned on.

As described above, during the period, the attenuation circuit 1001 outputs a large number of voltage pairs having a constant ratio to each other in a time series order. In addition, during the period, switches 509 to 512 are turned on. As a result, the differential output of the attenuation circuit 1001 is analog-to-digital converted via the buffer 505. The digital correction unit 513 searches for and acquires a set of the correction coefficients by a method disclosed in PTL 3 based on the binary digital value output by the 1-bit analog-to-digital conversion unit 506 for each cycle. In addition, the digital correction unit 513 performs a correction calculation using the acquired set of correction coefficients during the calculation of the reservoir computer, and outputs the analog-to-digital conversion result (DO).

As described above, in the present embodiment, a series of voltages required to acquire a set of the correction coefficients is generated by diverting the capacitor array circuit unit 501 and the non-linear amplifier/buffer 502, so that a necessary additional circuits are reduced. Therefore, a mounting area of the neuron circuit can be reduced. As a result, more neuron circuits can be integrated in the reservoir unit. Therefore, it is possible to realize the reservoir computer capable of executing a more accurate or more advanced time series AI.

According to each of the above-described embodiments, in the reservoir computer using the analog integrated circuit, it is possible to achieve both reduction of circuit noise and circuit mounting area, and to realize the high-accurate time-series AI. By applying the embodiments, it becomes possible to realize the miniaturization, cost reduction, low power consumption, and high-accurate time-series AI of the reservoir computer.

REFERENCE SIGN LIST

101 capacitor array circuit unit
102 non-linear amplifier
103, 104 capacitor memory unit
105 buffer
106 analog-to-digital conversion circuit
201, 202, 203, 204, 205, 206 capacitor
207, 208, 209, 210, 211, 212 switch
213, 214, 215, 216, 217, 218 switch
219, 220 switch
301, 304 capacitor
302, 303, 305, 306 switch
401 reservoir unit
402 output layer
501 capacitor array circuit unit
502 non-linear amplifier/buffer
503, 504 capacitor memory unit
505 buffer
506 1-bit analog-to-digital conversion unit
507, 508 capacitor
509, 510, 511, 512 switch
513 digital correction unit
601, 602, 603, 604, 605, 606 unit capacitor
607, 608, 609, 610, 611, 612 switch
613, 614, 615, 616, 617, 618 switch
619 connection control unit
701 1.5-bit analog-to-digital conversion unit
801 non-linear amplifier/preamplifier
802 latch circuit
901, 904 NMOS transistor
902, 905 NMOS current source
903, 906 resistor
907 switch
908, 910 PMOS transistor
909, 911 PMOS current source
1001 attenuation circuit
1101, 1102, 1103 resistor
1104, 1105, 1106, 1107 switch

The invention claimed is:

1. A reservoir computer comprising:
a reservoir unit provided with a plurality of neuron circuits; and
an output layer,
wherein each of the neuron circuits includes a plurality of inputs, an analog output, and a digital output,
wherein each of the plurality of inputs is supplied with the analog output of any one of other neuron circuits, the analog output of the neuron circuit itself, or an analog input signal from outside,
wherein the neuron circuit includes a capacitor circuit, an amplifier, a capacitor memory circuit, a buffer circuit, and an analog-to-digital conversion circuit,
wherein the capacitor circuit includes a plurality of capacitors between the plurality of inputs and a single output, performs a product-sum calculation on analog signals supplied to the plurality of inputs together with the amplifier, and performs a non-linear calculation on a result of the product-sum calculation by using saturation characteristics of the amplifier,
wherein the capacitor memory circuit has two lanes, each lane including a capacitor and a switch, wherein each of the lanes is capable of sampling a result of the non-linear calculation output from the amplifier, storing the result as an electric charge in the capacitor, and supplying a voltage to the buffer circuit based on the stored electric charge, wherein the capacitor memory circuit alternately switches roles of the sampling and voltage supply of the two lanes, wherein an output of the buffer circuit is the analog output of the neuron circuit, wherein the analog-to-digital conversion circuit performs an analog-to-digital conversion on the output of the buffer circuit, and a result of the analog-to-digital conversion is the digital output of the neuron circuit, and the digital output is input to the output layer, and the output layer outputs a calculation result, wherein the capacitor circuit includes a plurality of switches, the plurality of switches include first switches respectively arranged between the plurality of inputs and the plurality of capacitors, wherein the analog signals supplied to the plurality of inputs are a plurality of differential signals, and a first differential signal is input to a first capacitor via one of the first switches and to a second capacitor via another one of the first switches, wherein the plurality of inputs are connected to a first direct voltage via a plurality of respectively corresponding second switches, wherein respective outputs of the first capacitor and the second capacitor are connected to a second direct voltage via respective third switches, and wherein during the product-sum calculation, the first switches are always on and the second switches are always off.

2. The reservoir computer according to claim 1, wherein the third switches of the capacitor circuit are implemented with a MOS transistor having a threshold voltage higher than that of the first switches, and the third switch is used to reset electric charges of at least one or more of the plurality of capacitors of the capacitor circuit.

3. The reservoir computer according to claim 1, wherein the analog-to-digital conversion circuit is a cyclic type analog-to-digital conversion circuit.

4. The reservoir computer according to claim 3, wherein the amplifier is capable of being switched to a configuration of a buffer amplifier, and wherein the cyclic type analog-to-digital conversion circuit is configured by using at least one or more of the plurality of capacitors of the capacitor circuit, the configuration of the buffer amplifier, the buffer circuit, and a predetermined bit analog-to-digital converter.

5. The reservoir computer according to claim 4, wherein the plurality of capacitors of the capacitor circuit are configured with unit capacitors having the same capacitance value, wherein while the amplifier is switched to the configuration of the buffer amplifier, the output of the buffer circuit is connected to the plurality of capacitors to perform sampling, the output of the buffer circuit is digitally converted by the predetermined bit analog-to-digital converter, and a predetermined potential is connected to each of the unit capacitors based on an output of the predetermined bit analog-to-digital converter, and wherein the output of the capacitor circuit charges a capacitor for an analog-to-digital conversion through the configuration of the buffer amplifier, and an electric charge of the capacitor for an analog-to-digital conversion is input to the buffer circuit.

6. The reservoir computer according to claim 4, wherein the predetermined bit analog-to-digital converter is a 1-bit analog-to-digital converter or a 1.5-bit analog-to-digital converter.

7. The reservoir computer according to claim 1, wherein the analog-to-digital conversion circuit is a successive approximation type analog-to-digital conversion circuit.

8. The reservoir computer according to claim 7, wherein the amplifier is capable of being switched to a configuration of a preamplifier for a comparison circuit, and wherein the successive approximation type analog-to-digital conversion circuit is configured by using at least one or more of the plurality of capacitors of the capacitor circuit, the configuration of the preamplifier, and a latch circuit provided on an output side of the amplifier.

9. The reservoir computer according to claim 4, wherein the amplifier includes a switch for switching a configuration, and by using the switch for switching the configuration, when performing the product-sum calculation, the amplifier is switched to a configuration of a source grounded amplifier, and when performing the analog-to-digital conversion, the amplifier is switched to a configuration of a source follower circuit as the configuration of the buffer amplifier.

10. The reservoir computer according to claim 8, wherein the amplifier includes a switch for switching a configuration, and by using the switch for switching the configuration, when performing the product-sum calculation, the amplifier is switched to a configuration of a source grounded amplifier, and when performing the analog-to-digital conversion, the amplifier is switched to the configuration of the preamplifier.

11. The reservoir computer according to claim 4, wherein a series of voltages are generated by using at least one or more of the plurality of capacitors of the capacitor circuit, the configuration of the buffer amplifier, and an attenuation circuit provided on the output side of the amplifier, and the attenuation circuit includes a plurality of resistors and a plurality of switches, and searches for a set of coefficients for performing a correction calculation in the analog-to-digital conversion by using the generated series of voltages.

12. The reservoir computer according to claim 1, wherein the buffer circuit is a source follower circuit.

* * * * *